US008015507B2

(12) United States Patent
Madsen et al.

(10) Patent No.: US 8,015,507 B2
(45) Date of Patent: Sep. 6, 2011

(54) GRAPHICAL USER INTERFACE FOR A REMOTE OPERATED VEHICLE

(75) Inventors: Steve Madsen, London (GB); Tracy Currer, London (GB); Graham Michael Pullin, London (GB)

(73) Assignee: H2Eye (International) Limited, Tortola (VG)

( * ) Notice: Subject to any disclaimer, the term of this patent is extended or adjusted under 35 U.S.C. 154(b) by 2150 days.

(21) Appl. No.: 10/012,723

(22) Filed: Nov. 5, 2001

(65) Prior Publication Data

US 2003/0085930 A1  May 8, 2003

(51) Int. Cl.
*G06F 3/00* (2006.01)

(52) U.S. Cl. .......................... 715/824; 715/846; 715/768

(58) Field of Classification Search .................. 715/589, 715/768, 821, 824, 792, 846
See application file for complete search history.

(56) References Cited

U.S. PATENT DOCUMENTS

| | | | |
|---|---|---|---|
| 4,078,317 A * | 3/1978 | Wheatley et al. ............... 434/43 |
| 5,208,903 A | 5/1993 | Curry | |
| 5,283,560 A | 2/1994 | Bartlett | |
| 5,388,990 A | 2/1995 | Beckman | |
| 5,412,569 A | 5/1995 | Corby, Jr. et al. | |
| 5,933,141 A * | 8/1999 | Smith ............................. 725/39 |
| 5,953,010 A * | 9/1999 | Kampe et al. ................. 715/772 |
| 6,118,427 A | 9/2000 | Buxton et al. | |
| 6,232,957 B1 | 5/2001 | Hinckley | |
| 0,012,022 A1 | 8/2001 | Smith | |
| 6,333,753 B1 | 12/2001 | Hinckley | |
| 6,337,698 B1 | 1/2002 | Keely, Jr. et al. | |
| 6,439,956 B1 * | 8/2002 | Ho ................................. 446/454 |
| 6,535,793 B2 * | 3/2003 | Allard ........................... 700/259 |
| 2001/0037163 A1 | 11/2001 | Allard | |

FOREIGN PATENT DOCUMENTS

| | | |
|---|---|---|
| EP | 0 411 498 | 2/1991 |
| EP | 0 511 154 | 10/1992 |
| EP | 0 674 977 | 10/1995 |
| JP | 11-139390 | 5/1999 |
| WO | 97/20244 | 6/1997 |
| WO | 98/37483 | 8/1998 |
| WO | 00/31673 | 6/2000 |

OTHER PUBLICATIONS

IBM Technical Disclosure Bulletin, Transluscent Windows for Graphical-User Interfaces, vol. 37, No. 04B, Apr. 1994, pp. 101-102.
European Search Report for corresponding application No. 02257022.0 dated Aug. 19, 2009.

* cited by examiner

*Primary Examiner* — Dennis Bonshock
(74) *Attorney, Agent, or Firm* — Renner, Otto, Boisselle & Sklar, LLP

(57) ABSTRACT

A graphical user interface (GUI) for a remote operated vehicle (ROV) with an onboard video camera with pan-and-tilt mechanism. A broad translucent compass bearing icon is arranged horizontally with scrolling compass bearing marks that give the user visual feedback for steering the ROV as well as hard information relating to the bearing. A long translucent depth icon is arranged vertically with depth reading marks that scroll up and down as the ROV moves down and up respectively. A pan-and-tilt icon at the top center of the screen gives user feedback as to the direction in which the ROV camera is pointing relative to the ROV. Status indicator icons and the other icons are inserted and removed by special burn-in and fade-out processes to provide good visibility at the same time as continuity of viewing.

5 Claims, 12 Drawing Sheets forward right down left up

GRAPHICAL USER INTERFACE FOR A REMOTE OPERATED VEHICLE

BACKGROUND OF THE INVENTION

The invention relates to a remote operated vehicle (ROV), more specifically to a graphical user interface (GUI) for a ROV.

ROVs have been used widely for industrial applications, such as for the oil industry, and for oceanographic research, for example for studies of seabed flora and fauna.

ROVs are typically designed and made as individual units, or produced in very small numbers, with specific projects in mind. Often the ROV is an expensive piece of capital equipment which cannot be replaced without remanufacture. The pilot of an ROV is usually a highly skilled worker who's job it is to drive the ROV. The pilot will have responsibility for flying the ROV for the duration of a mission, which may typically be one or more days or weeks on board an ocean-going research or survey vessel. Consequently very little regard is had in conventional ROV design to aspects such as ease of use, since the pilot will be able to devote a large amount of study time and practice time in order to become highly proficient in flying the ROV.

The present invention takes as its its starting point the position of a ROV for leisure use which has a built-in video camera for transmitting real-time video footage back to the pilot.

FIG. 1 of the accompanying drawings schematically shows a proposed ROV system for the leisure market comprising a handset 16 (remote hand controller), a control computer 18 with associated display 20 and custom hardware and software, a fish 10 (the ROV) and an umbilical cable 14 interconnecting the topside control computer 18 and fish 10. The umbilical cable 14 carries a video signal from the fish 10 to the control computer 18 for representation on the display 20.

By contrast to an ROV for industrial or research use, an ROV for leisure use will need to be easy to use. As a consumer product, the user will not want to have to undergo intensive self-training or expert tuition in order to be able to fly the ROV competently. The consumer will wish simply to buy or hire the ROV and then use it with the minimum of fuss. The design must make steering stable and easy to perform. It must be difficult for a user to generate knots in the control cable connecting the ROV to the topside controller. The ROV itself must be designed to minimize the risk of fouling the thrusters with weeds. There are thus a number of design considerations which become much more important as soon as one envisages a ROV for the leisure market piloted by novice users.

The GUI, to which the present invention relates, is another part of the ROV design which can contribute to ease-of-use, by allowing control data to be fed back to the pilot, such as depth, direction, whether the ROV lights are turned on, on-board battery power levels and so forth. The selection of the control data supplied to the pilot, and its layout, are crucially important for a non-expert, inexperienced leisure user. At one extreme, one may consider the cockpit of an airplane, where the pilot is expert and highly trained. To a novice, the numbers of indicators and controls is bewildering. The GUI of an ROV for the leisure market must be as far away from the airplane cockpit design approach as possible.

As well as providing control data feedback, there is a more fundamental and subtle issue regarding the GUI design for a leisure-use ROV. The quality of the consumer experience will depend in large measure on how enjoyable it is to view the video footage when flying the ROV. This not only means that the control data needs to be displayed in an efficient, intuitive, non-language dependent way that does not clutter the video footage, but that the GUI must be designed in a way that enhances, rather than compromises, the user's enjoyment of the underwater environment, as perceived through the real-time (or played back) video footage from the ROV.

SUMMARY OF THE INVENTION

Icon Creation and Removal

A first aspect of the invention relates to the manner in which icons are created on and removed from the GUI. The underwater environment is perceived by a diver as a delicate, fragile and beautiful environment, with an expectation of the unknown or unexpected about to occur. Light levels are often low contributing to the overall perception.

Following on from this, it has been recognized by the inventors that it is critical for transmitting a true diver experience to a leisure ROV user, that the GUI is free from sudden jarring or shocking experiences which will destroy the user's perception of the underwater world portrayed by the video footage from the moving ROV. At the same time, the GUI is the main platform for giving the user feedback of control data relevant to piloting the ROV, so that generally icons will need to be presented on the display. However, the amount of screen space occupied by control information needs to be minimized to avoid excessively obscuring the video footage.

To satisfy these conflicting requirements the invention provides special icon creation and removal processes.

The invention provides an icon burn-in process for a GUI of a ROV, comprising: receiving a command signal to create the icon; presenting a faded representation of the icon on the GUI; and progressively intensifying the icon from its faded representation to a normal representation.

In this way, important user feedback in the form of an icon showing, for example, a lights-on indicator, or camera selection, can be created in a gentle, but effective manner which preserves the continuity of the user's underwater experience. Advantageously, the icon is progressively intensified from its faded representation to a saturated representation, followed by partially dimming of the icon from its saturated representation to attain the normal representation.

In an embodiment of the invention the saturated representation is a featureless glowing form of the icon.

In an embodiment of the invention the normal representation is a featured, focused form of the icon, and the faded representation is an invisible or barely visible form of the icon.

The invention further provides an icon fade-out process for a GUI of a ROV, comprising: receiving a command signal to remove the icon; and progressively decreasing opacity of the icon to change it from a normal representation to a faded representation.

The command signal originates from the ROV controller or the ROV (the fish). In some cases, the origin of the command signal may be either the ROV controller or the ROV, for example lights-on indicator. In other cases, the command signal will come from the ROV, for example ROV battery charge status indicator.

The fade-out process allows icons to be removed from the GUI, for example when no longer serving any useful purpose, in a very unobtrusive manner which preserves the continuity of the user's underwater experience. Icon removal is important to the underwater experience, since the experience is enhanced by removal of all unnecessary icons, leaving the GUI as free as possible to display the underwater video footage. For example, when lights are switched off, it is beneficial to remove a lights indicator icon to free up screen area for representing video footage. Similarly, an icon representing ROV speed changes or speed can be removed a short time after ROV speed is stabilized or when the ROV is stationary. The fade-out process allows these icons to be removed without disturbing the user.

In an embodiment of the invention, the icon is progressively blurred simultaneously with progressively decreasing its opacity, the normal representation is a featured, focused form of the icon, and the faded representation is an invisible or barely visible form of the icon.

Further aspects of the invention relate to a computer program product for implementing the icon burn-in and fade-out processes, and to an ROV controller operable to implement the icon burn-in and fade-out processes. It will be understood that the processes may be implemented in a mixture of software, firmware and hardware, as desired.

Motion Feedback Icons

A second aspect of the invention relates to the representation of position and direction information on the GUI. It is vitally important for a leisure user of an ROV that steering of the ROV can be performed stably and intuitively. The inventors have discovered that effective visual feedback for steering can be provided by displaying a rolling compass icon that extends across a significant portion of the screen straddling left and right sides of the screen.

The invention provides a GUI comprising a display of video footage from a ROV and a orientation feedback icon extending from a left side of the display to a right side of the display, the orientation feedback icon having directional marks that move to the left responsive to rightward orientation change of the view direction of the video footage and vice versa.

During ROV flight, the left/right motion of the directional marks that straddle the left and right sides of the display provide subconscious feedback to the pilot about the steering of the ROV.

Usefully, at least a subset of the directional marks can represent compass bearings indicating the orientation of the ROV during capture of the video footage. The representation of compass bearings on the display can be useful for orienting the ROV. It should however be emphasized that a principal benefit of the orientation feedback icon is the subconscious feedback to the pilot caused by left/right sweeping motion of the directional marks, not the actual hard information content of any such marks. For the same reason, the experience of a viewer of recorded video footage is enhanced, since the left and right sweeping of the directional marks over the icon area allow the viewer to subconsciously follow the orientation changes that the ROV underwent during filming of the video footage.

The effect is most beneficial when the orientation feedback icon is substantially vertically symmetrically disposed about a vertical center line of the display. With this arrangement, the subconscious impression of being in the ROV is enhanced to provide a virtual reality like effect.

The intuitive feedback effect is also enhanced when the orientation feedback icon extends over a substantial fraction of the total width of the display, the substantial fraction being at least 20%, 25%, 30% or 35% of the total width of the display.

The orientation feedback icon is preferably arranged to extend along the bottom or top of the display, more preferably slightly offset from the bottom or top edges of the display.

Advantageously, the orientation feedback icon is provided with a translucent coloring so as to be visible while not obscuring the video footage. Different background colors for the translucent area may be chosen, for example blue, gray or white tints.

The effect can be further enhanced wherein the directional marks continue to be represented on the display when they move outside the orientation feedback icon beyond its left or right edge, but are progressively decreased in opacity until they disappear. The directional marks can also be progressively blurred simultaneously with progressively decreasing their opacity as they move outside the orientation feedback icon area. The enhancing effect of these features can be understood by considering the fact that the pilot's subconscious perception of the diving space is in a cylindrical coordinate system with the cylinder axis being the vertical. The fading and optional blurring of the directional marks outside the orientation feedback icon area gives the impression of roundness, which subconsciously resonates with the pilots mental image in this cylindrical coordinate system. The gradual fading of the direction marks also prevents the marks suddenly disappearing from view, thereby avoiding subjecting the viewer to a sudden image change which may reduce the enjoyment of the underwater experience.

The invention may also provide a GUI comprising a display of video footage from a ROV and a depth feedback icon extending from an upper half of the display to a lower half of the display, the depth feedback icon having depth marks that move up and down responsive to the view depth of the video footage lowering and rising respectively.

During ROV flight, the up/down motion of the depth marks that straddle the upper and lower halves of the display provide subconscious feedback to the pilot about changes in the depth of the ROV.

Usefully, at least a subset of the depth marks can represent depth readings of the ROV taken during capture of the video footage. The representation of depth values on the display can be useful in itself. It should however be emphasized that a principal benefit of the depth feedback icon is the subconscious feedback to the pilot caused by up/down sweep of the depth marks as the ROV moves down/up, not the actual hard information content of any such marks.

The effect is also enhanced when the depth feedback icon extends over a substantial fraction of the total height of the display, the substantial fraction being at least 20%, 25%, 30% or 35% of the total height of the display.

The depth feedback icon is preferably arranged to extend along the left or right side of the display, more preferably slightly offset from the left or right edges of the display.

Advantageously, the depth feedback icon is provided with a translucent coloring so as to be visible while not obscuring the video footage.

The depth marks can advantageously continue to be represented on the display when they move outside the depth feedback icon beyond its top or bottom edge, but are progressively decreased in opacity until they disappear. The depth marks can also be progressively blurred simultaneously with progressively decreasing their opacity as they move outside the depth feedback icon area. The gradual fading, and optional simultaneous blurring, of the depth marks prevents the marks suddenly disappearing from view, thereby avoiding subjecting the viewer to a sudden image change which may reduce the enjoyment of the underwater experience.

It will be appreciated that the orientation and depth feedback icons are compatible and preferably both used.

Further aspects of the invention relate to a computer program product for implementing the GUIs as described above, and to an ROV controller operable to implement the GUIs described above. It will be understood that the processes may be implemented in a mixture of software, firmware and hardware, as desired.

Camera Orientation Icon

A third aspect of the invention relates to a ROV with an onboard video camera mounted on a pan-and-tilt mechanism which allows the optical axis of the video camera to be moved up and down, and to the left and right, relative to a straight forward direction defined by the direction of straight ahead motion of the ROV, i.e. relative to the straight ahead motion axis of the ROV. In this situation there is an additional level of complexity which needs to be fed back to the pilot, or viewer of recorded video footage, which conveys in a simple intuitive and accessible fashion how the video camera is, or was, pointing. For example, a common video shot is flying the ROV above the seafloor with the video camera pointing down. Efficient feedback of this feature is important, since if there is a mis-perception of the user as regards the optical axis of the video camera and the motion axis of the ROV, the ROV is liable to be crashed.

The invention provides a GUI comprising a display of video footage from a ROV and a pan-and-tilt icon comprising a marked area and a camera direction symbol within the marked area that moves up and down, and left and right, across the marked area to track corresponding changes in orientation of the optical axis of the video footage relative to the straight ahead motion axis of the ROV.

Location of the camera direction symbol at a center position in the marked area can advantageously be used to indicate coincidence between the optical axis of the video footage and the straight ahead motion axis of the ROV.

The marked area can be circular, oval, square or rectangular, or of other shape. The camera direction symbol may have a cross-hair form.

The GUI is preferably operable to remove the pan-and-tilt icon from the display after existence of coincidence between the optical axis of the video footage and the straight ahead motion axis of the ROV for a defined period of time. This is useful, since when the camera is pointing straight ahead, there is no need to convey feedback to the pilot, since alignment between these axes is the subconsciously assumed orientation. Removal of the icon has the advantage of freeing up space for the video footage. The pan-and-tilt icon removal may take place with fading and blurring as described further above.

Advantageously, the pan-and-tilt icon is provided with a translucent coloring so as to be visible while not obscuring the video footage. Different background colors for the translucent area may be chosen.

Further aspects of the invention relate to a computer program product for implementing the GUI as described above, and to an ROV controller operable to implement the GUI described above. It will be understood that the processes may be implemented in a mixture of software, firmware and hardware, as desired.

Motion Feedback Overlays

A fourth aspect of the invention relates to providing motion feedback through the GUI by overlaying motion feedback features on the main part of video footage from a ROV.

The invention provides a GUI for a ROV, operable to:
a) receive a frame of video footage;
b) superimpose synthesized features on the frame;
c) display or store the frame with the synthesized features;
d) recompute positions of the synthesized features responsive to ROV motion occurring over a time interval;
e) receive a further frame of video footage;
f) superimpose the recomputed synthesized features on the frame;
g) display or store the further frame with the recomputed synthesized features; and
h) repeat procedures d) to g) so that the synthesized features and video footage provide an impression of the ROV motion.

The time interval is preferably matched to a frame rate of the video footage, for example the time interval can be equal to the frame interval or be an integer multiple of the frame interval, e.g. 2, 3 or 4 times longer than the frame interval.

It will be understood that references to frames and video footage do not imply that the image from the ROV camera necessarily is in the form of a TV/video signal such as PAL/NTSC format although this is preferred. Any transmission protocol whether TV-based, video-based, telecommunications-based or computer-based may be used for transmitting the moving pictures.

References to displaying or storing the frames, is intended to convey the fact that the overlay with synthesized features may occur simultaneous with viewing, or may be performed without viewing of the video footage.

In an embodiment of the invention, the synthesized features are stored and recomputed in a 3D space, and mapped onto a 2D space for superposing on the frames of video footage.

In the best mode, the synthesized features are point features. Point features can be used to replicate the effect of swimming through plankton or air bubbles. Examples of point features are thus referred to in the following as virtual plankton or virtual bubbles. The point features may be enlarged and reduced in size according to the changing distance between the simulated feature and the ROV.

Alternatively, the synthesized features may be line features. The line features, may be discrete horizontal lines that are overlayed on the video frames to give a "rolling road" effect, in which horizontal lines are generated in the distance centrally in the screen view, as perceived by the viewer, and then expanded in length and moved down as the ROV moves forward. The line features, may also be rectangle feature that are overlayed on the video frames to give a "corridor" effect, in which they are generated in the distance centrally in the screen view, as perceived by the viewer, and then expanded about a point. The point can be kept static between frames for straight ahead motion of the ROV and can be moved up or down, or to the left or right, to take account of ROV steering or attitude changes.

The GUI is operable to recompute the positions of the synthesized features responsive to a wide variety of signals, for example signals indicating at least one of ROV compass bearing, ROV depth, ROV position, ROV speed, ROV acceleration, and ROV steering.

Further aspects of the invention relate to a computer program product for implementing the GUI described above, and to a ROV controller operable to implement the GUI described above. It will be understood that the processes may be implemented in a mixture of software, firmware and hardware, as desired.

BRIEF DESCRIPTION OF THE DRAWINGS

For a better understanding of the invention and to show how the same may be carried into effect reference is now made by way of example to the accompanying drawings in which.

DETAILED DESCRIPTION

System Overview

Figure 1:
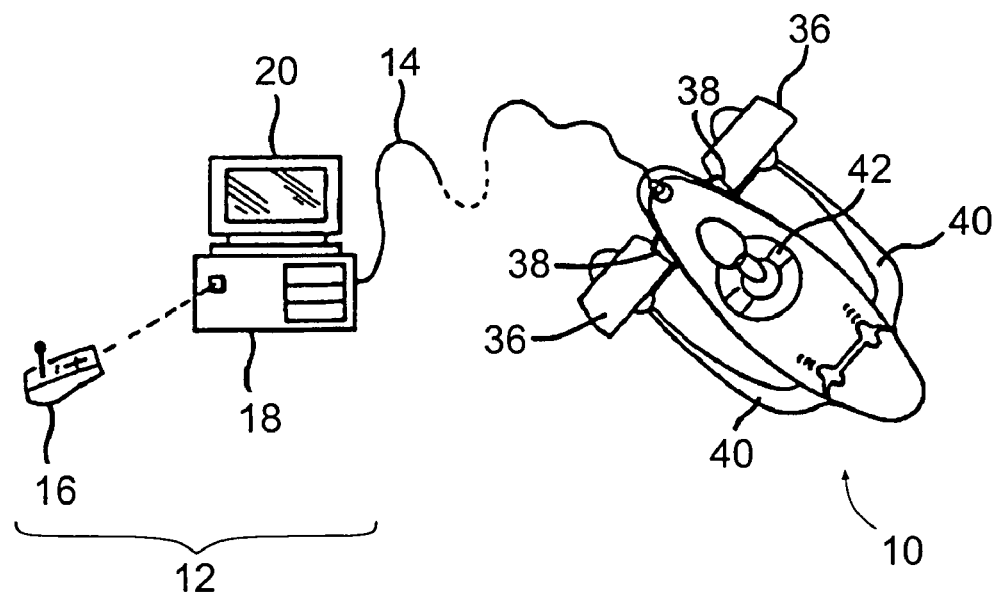
FIG. 1 schematically shows an ROV system comprising a handset (remote hand controller), a topside (control computer with monitor and associated custom electronics and software), a fish (the ROV) and an umbilical cable interconnecting the topside and fish.

FIG. 1 schematically shows an ROV system comprising a hand controller 16 (remote hand controller), a control computer 18 with associated display 20 and custom hardware and software, a fish 10 (the ROV) and an umbilical cable 14 interconnecting the topside and fish. The umbilical cable 14 is a coaxial cable with a conventional core for carrying a video signal from the fish 10 to the topside control computer 18. The fish 10 is self-powered by an onboard battery, so that no power needs to be carried down the cable. The battery is a removable, water-sealed unit. The hand controller 16 and control computer 18, 20 are collectively referred to as the topside 12.

Before describing the GUI, first the basic design of the ROV system components that impact on the GUI are described. These are the fish 10, the hand controller 16 and the communications hardware used to communicate between the fish 10 and control unit 18, and between the control unit 18 and the hand controller 16.

Detailed description of system components not directly relevant to an understanding of the GUI is omitted for the sake of brevity. For a fuller description of the ROV system than that given in the following, reference is made to WO-A-01/58751, the full contents of which are incorporated herein by reference.

Fish/ROV

FIG. 1 shows some basic components of the ROV 10, namely its twin side thrusters 36 which control forward and reverse motion, and left and right steering, as well as its vertical thruster 42, which controls up and down motion of the ROV. Also evident are its back arms 38 and front arms 40 which carry the side thrusters 36.

Figure 2:
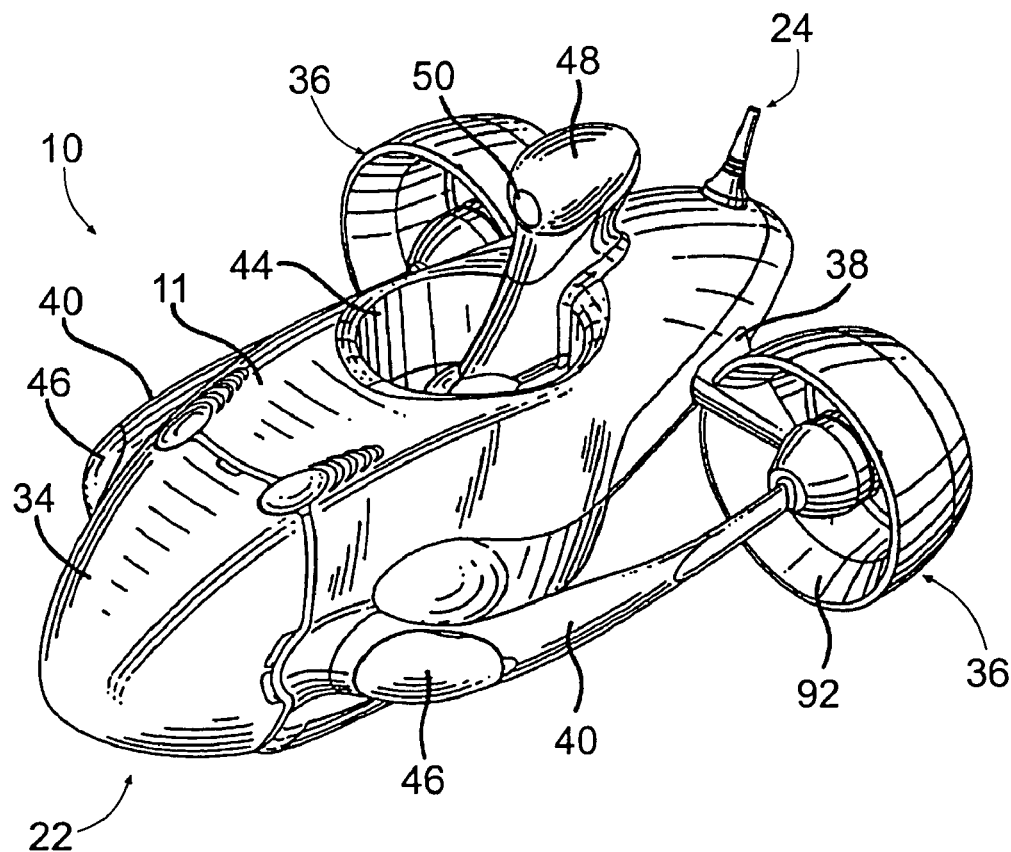
FIG. 2 is a perspective view showing the fish in more detail.

FIG. 2 is a perspective view of the ROV showing more detail. The ROV 10 comprises a main body 11 and has a front end 22 terminating in a transparent streamlined dome 34 behind which is mounted a video camera (not visible in FIG. 2), referred to in the following as the front camera. The main body 11 also has a rear end 24 where the cable connector is positioned. It can be seen that the vertical thruster 42 is provided inside the main body 11 of the ROV within a vent 44 extending through the main body 11 of the ROV. Moreover it can be seen that the side thrusters 36 are mounted in Korts 92. The front arms 40 sweep back from the front end 22 of the main body 11 and have forward facing lights 46 mounted therein. The lights 46 provide forward illumination to assist imaging underwater, especially in dark conditions. A further video camera (not shown), referred to in the following as the top camera, is provided within a periscope strut 48 extending upwards from the rear of the vent 44. A small front-facing window 50 is provided for the top camera to view through. A strobe light (not shown) is also fitted at the top of the periscope strut 48 for assisting in locating the ROV on the water's surface.

Figure 3:
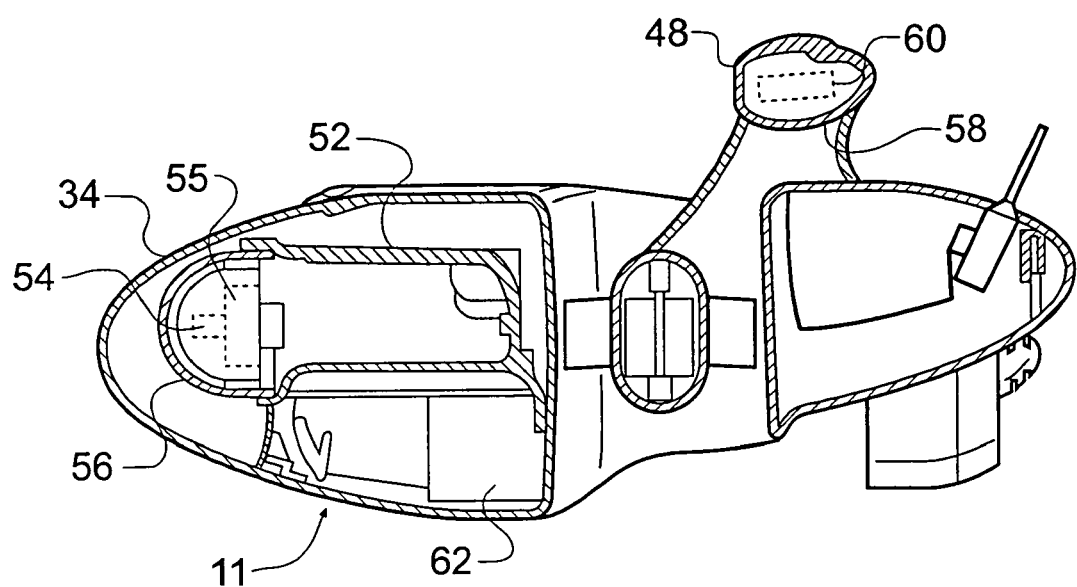
FIG. 3 is a partial vertical section of the fish revealing selected interior components.

FIG. 3 is a partial vertical section of the ROV showing selected interior components. It can be seen that, inside the ROV main body 11, there is arranged a pressure vessel 52 that houses the front camera 54. The front camera 54 is mounted on a pan-and-tilt mechanism 55 that allows the camera to be moved away from a straight-ahead alignment to be pointed up and down, or left and right. Electronics for controlling the ROV are also housed in the pressure vessel 52, the electronics being described further below. The pressure vessel 52 has a transparent glass front dome window 56 for optical access of the front camera 54. Inside a second pressure vessel 58 in the upper end of the periscope strut 48, the top camera 60 is mounted. The video signal from the top camera is supplied to the control electronics in the pressure vessel 52 by a connecting cable (not shown). The on-board battery 62 used for supplying the thrusters, lights and other components with power is also evident from the figure.

Hand Controller

Figure 4:
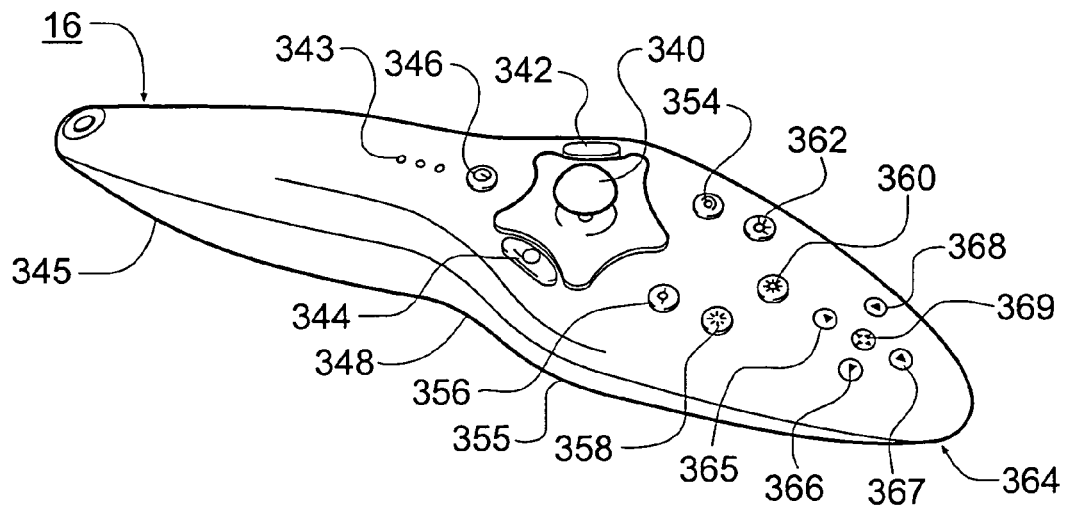
FIG. 4 is a perspective view showing the hand controller in more detail.
Figure 5:
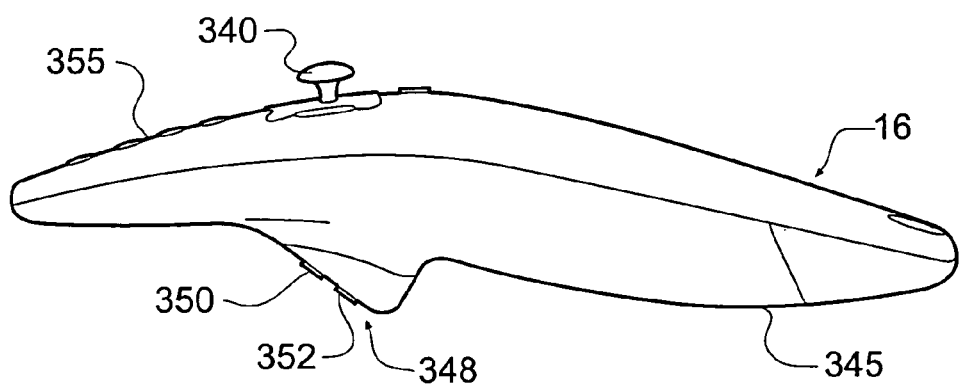
FIG. 5 is a side view of the hand controller.
Figure 6:
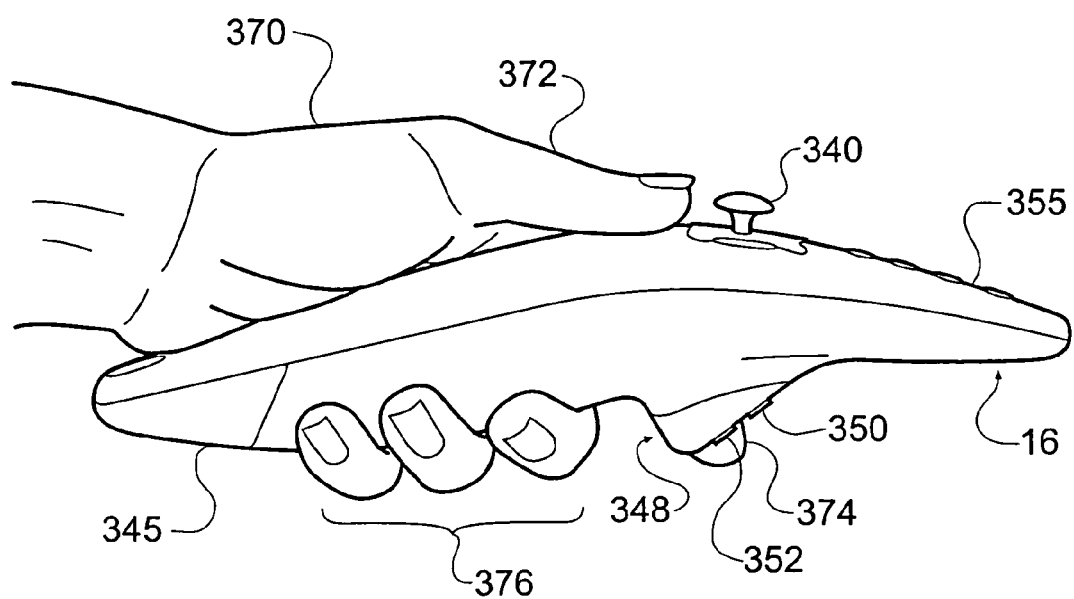
FIG. 6 is a side view of the hand controller in use, being gripped by the left hand of a user.

FIGS. 4-6 show the hand controller 16 in more detail. The hand controller comprises a handle portion 345 and a distal portion 355 having an upper surface visible to a user gripping the handle portion 345 between the fingers and palm of either the user's left hand or right hand. The hand controller is switched on and off with a button 346 arranged for thumb actuation. An array of three light emitting diodes (LEDs) 343 immediately under the on/off button 346 are illuminated according to the charge state of the internal batteries housed inside the hand controller.

FIG. 5 illustrates the hand controller 16 in side view. An upstanding analog thumb joystick 340 is evident extending from the upper surface of the hand controller. The joystick is mounted for thumb actuation by a left or right hand gripping the handle portion 345. The function of the joystick is for control of the side thrusters 36 of the ROV (see FIG. 2). More particularly, the thumb joystick 340 provides control signals for controlling the surge (forward/back motion) and yaw (left and right motion) of the ROV 10. The joystick is a two-axis (X-Y) potentiometer joystick. Positioned to the left and right side of the thumb joystick 340 are digital speed buttons 342 and 344 respectively which give direct control of the maximum power limit for the thrusters. The button 342 positioned to the left of the joystick reduces the maximum power applicable to the thrusters. The button 344 position to the right of the joystick 340 increases the maximum power limit applicable to the thrusters. The buttons 342 and 344 thus, for example, define a maximum linear speed of the ROV (surge) when the joystick 340 is pushed furthest forward, and also define maximum angular speed of the ROV (yaw) when the joystick 340 is pushed to one of its diagonal limits. This is useful for changing between sensitive low speed control (e.g. at a destination site) and high speed travel (e.g. from topside deployment area to destination site), and also for battery conservation. The maximum power limit control provided by the buttons 342 and 344 is a progressive control implemented by a time ramp in software in the topside computer unit 18. Control of the ROV 10 in the vertical direction (heave) is provided by a further controller 348 positioned in a trigger position on the underside of the hand controller 16. The trigger controller 348 is mounted for index finger actuation by a left or right hand gripping the hand controller 16 by the handle portion 345. The trigger controller 348 comprises two digital buttons 350 and 352 for actuating upward and downward motion of the ROV respectively. Control software on the topside computer unit 18 applies a time ramp on reception of a signal from one of the buttons 350 and 352, thus controlling the linear speed of the ROV in the vertical direction. Heave control is effected through the vertical thruster 42 arranged in the vent 44 in the main body 11 of the ROV 10.

FIG. 6 shows the hand controller 16 during use. The left hand 370 of a user is gripping the hand controller 16 between the middle, ring and little fingers 376 and the palm 371. The thumb 372 is stretched out resting on the upper surface of the hand controller immediately in front of the joystick 340. The user can actuate the joystick 340 without changing grip on the hand controller through movement of the thumb 372. The index finger 374 of the user is resting on the trigger controller 348 and is able to actuate either the up drive button 350 or the down drive button 352. Once again, this actuation can be performed without any change of grip of the user. The hand controller 16 thus allows control of all three degrees of freedom of the ROV (surge, yaw and heave) to be performed almost intuitively with a single hand operation. Moreover, the hand controller can be used equally well with the left hand or the right hand.

Further manual controls are also incorporated in the hand controller 16, as now described with reference to FIG. 4. A number of buttons are visible in the front portion of the upper surface of the hand controller. A group of buttons 364 is mounted towards the front nose of the hand controller. The button group 364 provides control for the pan-and-tilt mechanism 55 of the front camera 54. The button group 364 comprises a tilt-up button 367, a tilt-down button 365, a pan-left button 368 and a pan-right button 366 arranged in a star configuration with the buttons at North, South, East and West positions, as well as a pan-and-tilt center button 369 which is arranged centrally between the buttons 365-368 recessed in the surface of the hand controller. When all buttons are released, the front camera holds the last position. Pressing two adjacent buttons, for example buttons 366 and 367, produces a diagonal movement of the front camera 54. Actuation of the recessed button 369 in the middle of the four pan-and-tilt buttons serves to re-center the pan-and-tilt view of the front camera 54 so that it is facing straight ahead with its optical axis aligned with the main body 11 of the ROV.

A further group of five individual buttons is provided forward of the joystick 340 and behind the camera control button group 364.

Button 354 toggles between selection of the front camera 54 and the top camera 60. Selection of one camera implies transmission of that camera's video signal through the umbilical cable 14 to the control computer 18, resulting in the monitor 20 displaying video footage from the selected camera.

Button 356 toggles the display between full and reduced graphics modes, these modes being described further below.

Button 358 turns a "virtual plankton" graphics feature on and off with a toggle action, this feature being described further below.

Button 360 toggles the function of the button group 364 between the above described control of the pan-and-tilt mechanism 55 of the front camera 54, and use as menu control buttons which allow menu selection to be performed based on the display on the monitor 20. Menu selection is used for control of features that are not often needed or do not need to be adjusted during "flying" of the ROV, such as user-preference features. Examples of menu driven features are strobe light control, switching the display between metric and Imperial units, emergency eject of the umbilical cable and expert functions.

Button 362 switches the lights 46 on and off with a toggle action.

It will be appreciated that the camera control buttons 364 and the other control buttons 354-362 are easily controlled by the thumb or index finger of the user's other hand, that is the hand of the user which is not gripping the handle portion 345.

From the above, it will be appreciated that the hand controller has been designed to provide control functions in a very simple and accessible way, amenable to a novice user, the thruster and other controls being almost completely intuitive.

Communications

The communications between the hand controller 16, topside computer unit 18 and ROV 10 are now described in more detail.

Figure 7:
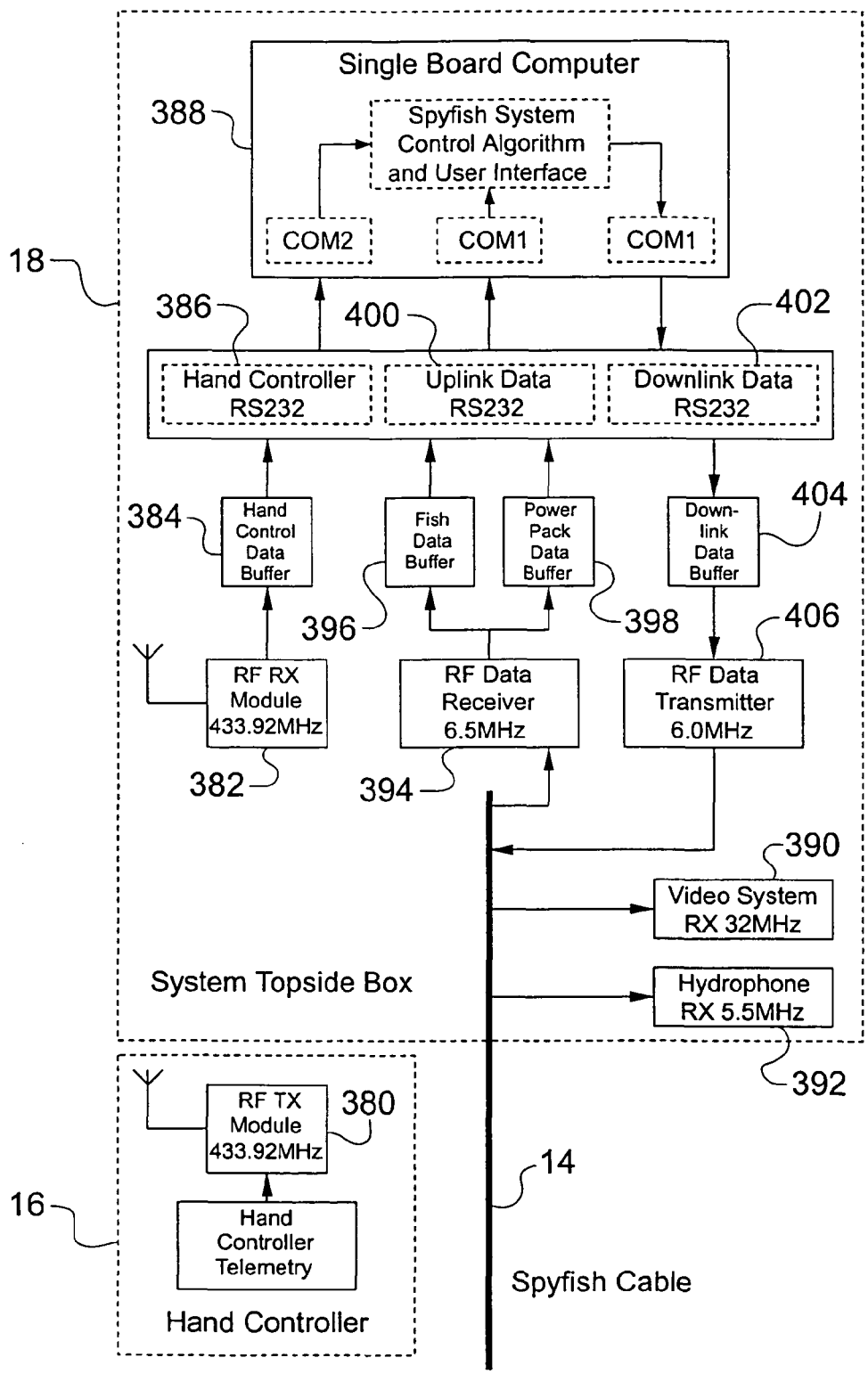
FIG. 7 is a block schematic hardware drawing of the topside and hand controller.

FIG. 7 shows block schematic hardware drawings of the hand controller 16 and the topside computer unit 18.

Figure 8:
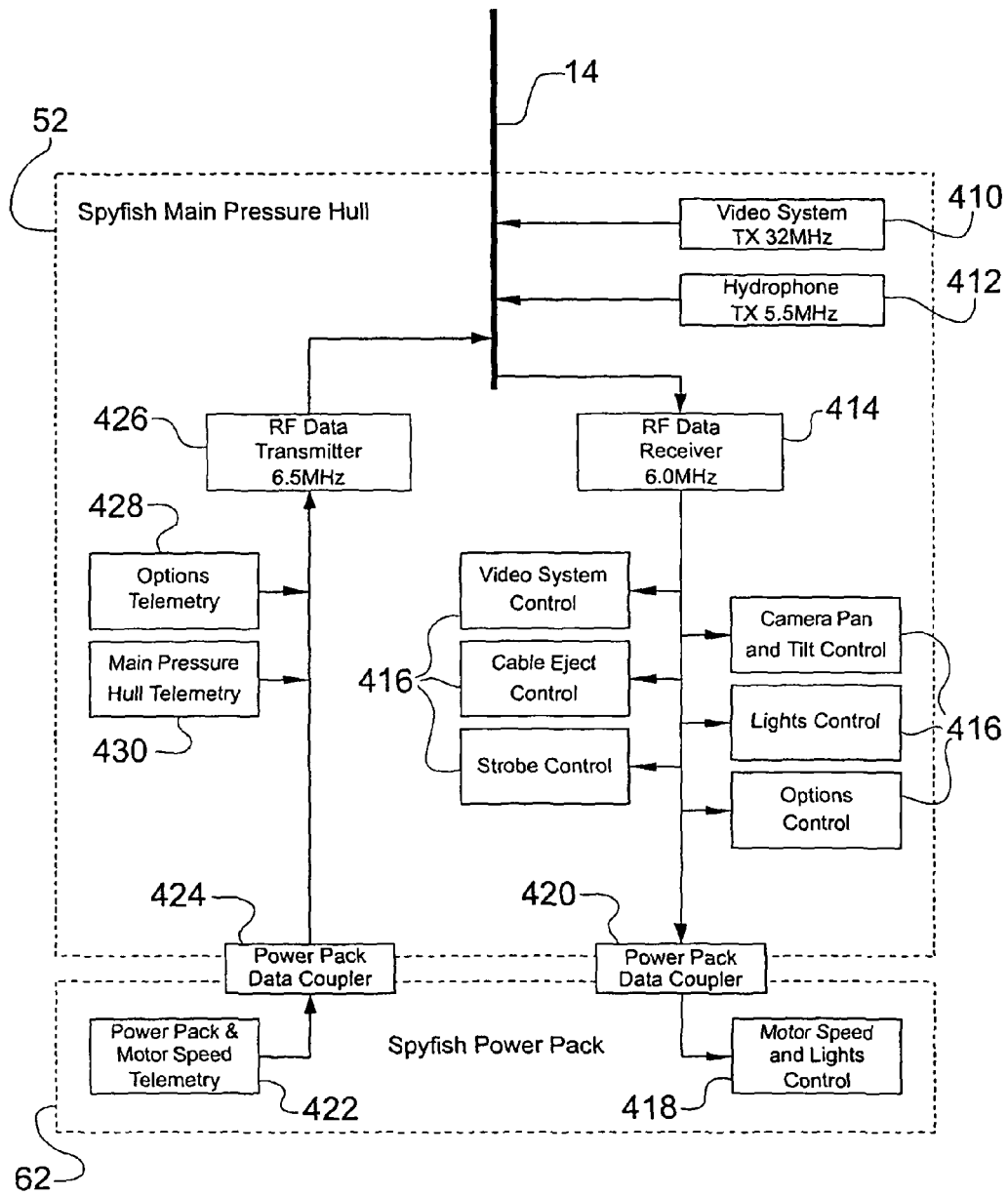
FIG. 8 is a block schematic hardware drawing of the fish control electronics.

FIG. 8 is a block schematic hardware drawing of the ROV control electronics. The hand controller uses wireless communication in air in the form of radio frequency (RF) transmissions. This is accomplished by a RF transmitter module 380, which is paired at the topside computer unit 18 by a RF receiver module 382. Both modules use a 433.92 MHz carrier. The data rate is 5 KHz, and the packet transfer rate is about 16.6 Hz (or every 60 ms). Packet length is approximately 20 ms.

When a packet is received by the topside receiver 382, it is encoded in standard RS-232 via a buffer 384 and forwarded at 9600 bauds data rate via a serial link 386 to the topside control computer 388. Packets are composed of 11 bytes of information from the hand controller and hence have a packet length of approximately 11 ms, transferred at a rate of the order of 14 Hz.

Communication from the ROV 10 is performed through the umbilical cable 14. The video and audio content of the ROV signals are collected by a 32 MHz video receiver 390 and a 5.5 MHz hydrophone receiver 392 respectively. The video picture from one or both of the ROV cameras and the audio signal from the hydrophone are transmitted from the ROV as analog frequency modulated (FM) signals on 32 MHz and 5.5 MHz carriers respectively.

Control signals from the ROV are received by a 6.5 MHz RF data receiver 394 and supplied via buffers 396 and 398, and a serial link 400 to the topside control computer 388. Control signals for the ROV, generated by the topside control computer responsive to the hand controller control signal inputs, are output to the cable 14 through a downlink comprising a serial link 402, data buffer 404 and 6.0 MHz RF data transmitter 406.

FIG. 8 is now referred to to describe the ROV internal data system which is housed in the main pressure hull 52 of the ROV (see FIG. 3). The control electronics in the pressure hull 52 is powered by the batteries in the ROV power pack 62. Video and audio data from the ROV hydrophone are transmitted to the topside control unit 18 through the umbilical cable 14 using a 32 MHz video system transmitter 410 and a 5.5 MHz hydrophone transmitter 412 respectively. Data received from the topside unit RF data transmitter 406 is received by a corresponding 6.0 MHz RF data receiver 414 connected to subcontrollers 416 for interpreting and outputting corresponding control signals for the video system control (e.g. camera selection), cable eject control (actuation of latch 261), periscope-mounted strobe light control, pan-and-tilt of the camera 225, control of the lights 46, and control of any option units mounted to the ROV. Motor and light control is effected through the power pack via a control unit 418 accessed from the RF data receiver 414 by a connection leading through a power pack data coupler 420. The power pack data coupler allows the 'Downlink' data stream to be transferred to the power pack with a non-contact interface. This can either be done by optical means or another stage of RF frequency shift keyed (FSK) modulation using carriers in the 200-400 kHz range.

Telemetry signals relating to the battery status and thruster motor status is sent from a telemetry unit 422 in the power pack through an 'Uplink' power pack data coupler 424 to a 6.5 MHz RF data transmitter 426 matched to the topside control unit RF data receiver 394. The 'Uplink' data coupler 424 is implemented similarly to the 'Downlink' data coupler 420. The power pack telemetry unit 422 sends cell voltage, power pack temperature and motor speed data. Telemetry signals from option units are supplied to the transmitter through an options telemetry unit 428. A pressure reading from a pressure sensor in the ROV pressure hull 52 is also supplied to the RF data transmitter 426 from a hull telemetry unit 430. The main pressure hull telemetry comprises compass bearing, depth, temperature and immersion data. If GPS is fitted, the main pressure hull will also send longitude and latitude position data. If inertial guidance, e.g. a fiber gyroscope, is fitted, the main pressure hull will also send ROV travel speed and direction information. The RF data transmitter 426 transmits to the RF data receiver 394 through the umbilical cable 14.

Graphics

Having described the fish, the hand controller and the hardware associated with the communications between the fish, control computer and hand controller, the graphical user interface (GUI) is now described.

Figure 9:
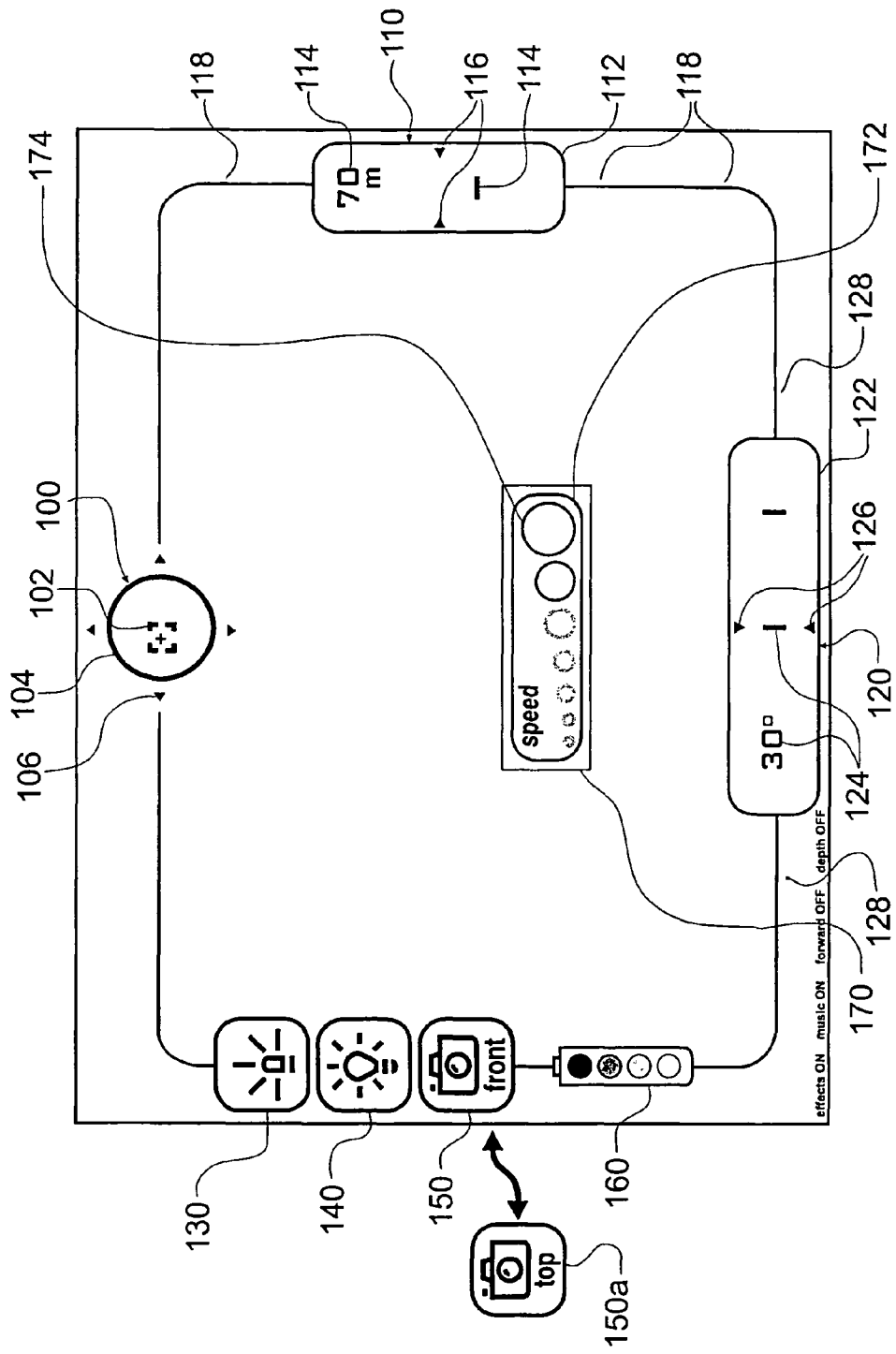
FIG. 9 is a screen shot of the display of the topside monitor during use showing features of the GUI.

FIG. 9 is a screen shot showing the main icons and other features of the GUI which are now explained in turn.

Pan-and-Tilt Icon

A pan-and-tilt icon 100 is positioned centrally at the top of the screen. The icon has the function of showing the direction in which the front camera 54 is pointing, as defined by its pan-and-tilt mechanism 55 (see FIG. 3). This avoids confusion when flying the ROV with the front camera not pointing straight ahead. The maximum travel of the pan-and-tilt mechanism is represented in the icon by the boundary of a marked area in the form of a circular translucent area bounded by a dark circular ring 104. Different background colors for the translucent area may be chosen, for example blue, gray or white tints. Four outwardly facing white triangle markers 106 are also provided, located outside the ring 104 at top/bottom/left/right positions, to further assist clarity of representation.

The current front camera alignment is conveyed to the viewer by the position of a white crosshair symbol 102 within the circular marked area. The crosshair symbol 102 moves up and down, and to the left and right, across the marked area to track corresponding changes in orientation of the optical axis of the front camera 54 relative to the straight ahead motion axis of the ROV.

Location of the crosshair symbol at the center of the circular marked area indicates coincidence between the optical axis of the front camera and the straight ahead motion axis of the ROV.

The crosshair icon fades as the camera approaches its centered position in pan and tilt. This feedback allows the user to "park" the front camera without having to depress the "center" button 369 on the hand controller nose (see FIG. 4). The entire pan-and-tilt icon disappears after the front camera has been parked in its straight ahead alignment for a period of time, but reappears automatically upon actuation of any of the pan-and-tilt actuation buttons 365-369 (see FIG. 4).

The entire pan-and-tilt icon also disappears when the top camera 60 is selected (see FIG. 3), since the top camera has no pan-and-tilt capability, or if the "graphics on/off" button 356 on the hand controller (see FIG. 4) is used to turn off non-essential graphics.

Depth Icon

A depth icon 110 is positioned on the right side of the screen. A generally rectangular translucent area bounded by a dark boundary 112 extends vertically between upper and lower halves of the display over about one third of the total height of the display symmetrically about the screen middle horizontal line. Different background colors for the translucent area may be chosen, for example blue, gray or white tints. The depth feedback icon has white depth marks 114 that scroll up and down responsive to the depth of the ROV falling and rising respectively. The depth marks are a combination of representations in white of numerical values at major intervals (e.g. 70 m shown in the figure) and horizontal white lines at minor intervals (e.g. 70.2 m shown in the figure). Major intervals may be 1 m or 5 m apart, for example. The reading is taken from the vertical center of the icon by the position between two inwardly facing white triangle markers 116. The size of the intervals may scale automatically during use. For example a coarse scale may be used during rapid diving or surfacing, and a fine scale used during periods over which the depth does not change significantly, for example when flying over the sea-floor.

The depth marks continue to be represented on the display when they move outside the depth feedback icon beyond its top or bottom edge, but are progressively decreased in opacity and blurred until they disappear. Three such out-of-icon-area depth marks 118 are evident in the figure. This soft fade out avoids sudden disappearance of the depth marks as they scroll outside the main translucent icon area.

The depth reading in feet or meters scrolls up or down informing the user of the depth at which the ROV is below the surface. The resolution of the ROV depth sensor is of the order of 0.1 m or 0.3048 feet. The user can select to display depth in either feet or meters via the menu system accessed through the hand controller. When feet are displayed, even values display the corresponding number value (0, 2, 4, . . . ) while odd values are represented as a horizontal dash. If meters are displayed (as illustrated), every integer value is represented with its number, and a small solid circle is used to represent intermediate values at a resolution of 0.2 m.

Compass Bearing Icon

A compass bearing icon 120 is provided at the bottom of the screen. A generally rectangular translucent area bounded by a dark boundary 122 extends across about one third of the width of the screen straddling left and right sides of the screen symmetrically about the vertical center line of the screen. Different background colors for the translucent area may be chosen, for example blue, gray or white tints. The compass bearing icon has white bearing marks 124 that scroll left and right responsive to the ROV moving to the right and left respectively. The bearing marks 124 are a combination of representations in white of letters (N,S,E,W) at cardinal values of compass bearings, of numerical values of compass bearings at intermediate bearings (e.g. 30, 60 degrees shown in the figure) and of vertical white lines at minor intervals (e.g. 40, 50 degrees shown in the figure). The reading is taken from the horizontal center of the icon by the position between two inwardly facing white triangle markers 126. In the figure, the ROV is holding a bearing of 40 degrees.

The bearing marks continue to be represented on the display when they move outside the compass icon boundary 122, but are progressively decreased in opacity and blurred until they disappear. In the figure, faded and blurred bearing marks are indicated with reference numeral 128, of which a vertical white line mark is evident to the left of the compass icon boundary, and a 60 degree white bearing value is evident to the right of the compass icon boundary. The fading and blurring of the bearing marks outside the translucent area of the icon gives the impression of roundness to the compass representation when scrolling. The gradual fading of the compass bearing marks also prevents the marks suddenly disappearing from view, thereby avoiding subjecting the viewer to a sudden image change.

This scrolling of compass bearing marks 124 across the screen, including display of cardinal points and numerical bearing values, helps the user to steer and get a feeling of where the ROV is pointing in relation to the boat or shore and generally assists steering and flying of the ROV both over short distances, such as at a site of interest for taking video footage, and longer distances, such as when traveling between shore and video location site.

To augment the visual feedback, the sound channel is overlayed with a "ping" noise on transition through a cardinal point (N, S, E or W bearing).

The compass icon 120 disappears according to the state of the graphics on/off button 356 (see FIG. 4).

Status Indicator Icons

A strip of status indicator icons are arranged along the left side of the screen which are now described in turn, starting from the uppermost icon and working down. These icons are opaque.

A beacon icon 130 is displayed whenever the ROV beacon is on. The ROV beacon is situated on the periscope strut 48 (see FIG. 2 where periscope strut is shown, but not beacon) and facilitates visual location of the ROV from the boat or shore. The beacon is typically used to assist retrieval of the ROV after surfacing, especially at night. The beacon icon 130 flashes when the beacon is on. The beacon is turned on and off through the menu. The beacon icon 130 is not affected by the state of the graphics on/off button 356. This is because use of the beacon is associated with a significant power drain, so it is important that the beacon icon is persistent whenever the beacon is on.

A lights icon 140 is visible for the duration that the ROV lights 46 are on (see FIG. 2). The lights consume power at a considerable rate, the icon reminds the user to use the lights sparingly. The lights icon is not affected by the graphics on/off button 356, so that if the lights are on the icon will persist at all times.

A camera icon 150 indicates which camera is selected, either the top camera 60 (fixed periscope mounted camera) or the front camera 54 with pan-and-tilt mechanism (see FIG. 3). The screen shot shows the camera icon 150 for selection of the front camera on the main screen, with its alternative form for selection of the top camera to the side of the screen area (reference numeral 150a).

A power icon 160 indicates the charge status of the ROV on-board power supply 62. The Lithium-Ion cells which power the ROV have a nominal voltage range between 12.6 and 9.0V during discharge. In order to enhance the resolution of the state of discharge using the available states of the power pack faded icons, the power pack will indicate completely full until a voltage of 11.4 is reached; at that point the segments of the power pack icon will fade with each drop of 0.2V. There are three segments arranged in a vertical column, with the segment on top progressing from fully on to fully dimmed, the remaining segments continuing in their fully on state; once the top segment is displaying empty the next segment down the stack begins to fade, and so on. If the power pack has more than 9.6V then the battery obeys the state of the graphics on/off button 356; at or below 9.6V the power icon will persist at all times so that the user remains aware that only a limited time is available to continue operations.

To augment the visual representation, the audio signal can be overlayed with sounds when status changes, for example when the lights are switched on and off or when the camera selection is changed. A "donk" noise is chosen in the present implementation. Moreover, when the power pack is indicating empty, a warning bell sound is inserted into the audio channel, along with synthesized voice messages at regular intervals to ensure the user recovers the ROV before power is completely depleted.

Speed Icon

A speed icon 170 positioned generally in the middle of the screen, slightly below the center point. The speed icon 170 has a generally rectangular translucent area bounded by a dark boundary 172. Within the translucent area there is a succession of circles 174, increasing in diameter from left to right, seven in this example. As available power is increased, the circles are made to glow white from the left to the right. Similarly if available power is decreased the number of white glowing circles is reduced, with the circles being changed from glowing white to faint dark, moving from the right to the left. The screen shot shows an intermediate power level with five of seven circles glowing white. The speed icon 170 informs the user when the power accessible to the thrusters from the power supply is changed. If the user holds down one of the power-up or power-down buttons 342, 344 on the hand controller (see FIG. 4), the available power value is adjusted, and the number of circles displayed changes accordingly. The circles fade smoothly from fully dimmed to full on, and then the next circle either fades in or out until all circles are fully on or fully faded, or until the user releases the power button.

The speed icon appears when changes to accessible power are made through the hand controller buttons 342, 344, and fades out a short time after conclusion of any such power change.

Icon Animation

All icons and sprites are stored in 32 bit Portable Network Graphic (PNG) format. When the software starts, for every animated image it opens, it checks whether an image strip has already been created on a previous run. If there is no image strip extant, then one is generated. The algorithm uses a simple convolution to blur or optionally intensify ("burn/ glow") the image, and creates a strip of progressively more blurred/faded images. This is then saved to the solid state disk (SSD) for future use.

A separate file is also created and stored containing the number of faded versions of the original image, plus the original image dimensions; this allows the software to open the image strip directly without having to resort to opening the original PNG in order to learn the dimensions of the basic image.

There are two possible animations of any icon, which are a burn in and a fade out.

The burn in starts from a faded state and progressively intensifies, then partially fades out to a "normal" state for continued display. Burn in is normally used when the power is turned on, or when the icons transitioning between normal control and menu modes.

Fade out progressively decreases the image opacity, optionally also blurring the image simultaneously.

Figure 10:
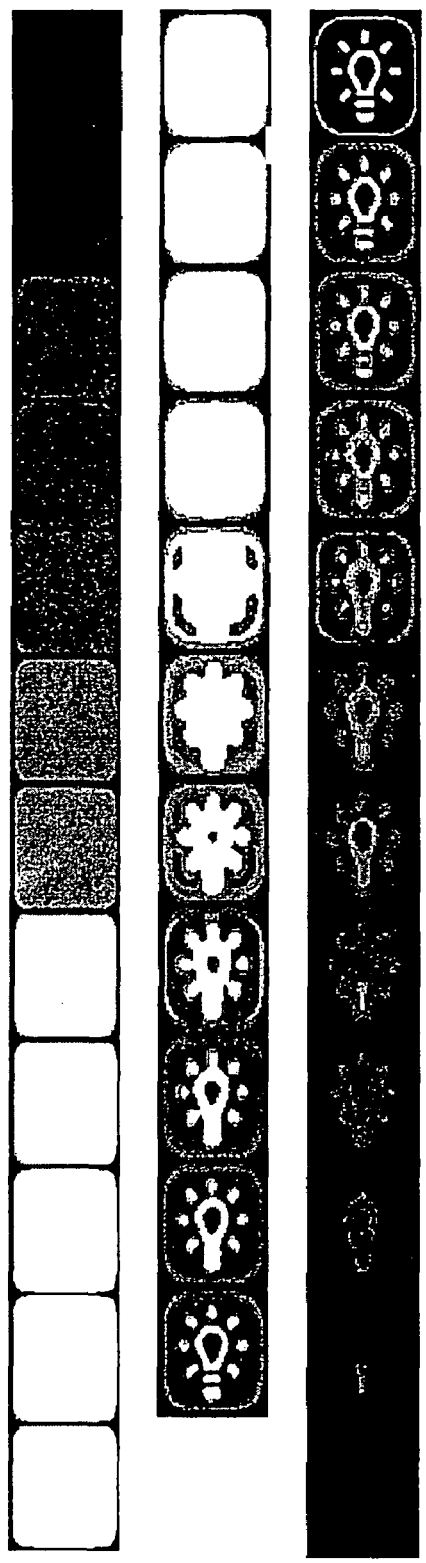
FIG. 10 shows in three sequential sub-strips the alpha channel of an image strip of an exemplary icon (sequence starts at top left, and finishes at bottom right)
Figure 11A:
FIGS. 11A-11E each show superimposed sequential frames in a display segment of the screen, each display segment containing a synthetic point feature in the form of a virtual bubble, with the bubble enlarging as time progresses and moving responsive to forward, right, down, left and up ROV motion respectively.
Figure 11B:
Figure 11C:
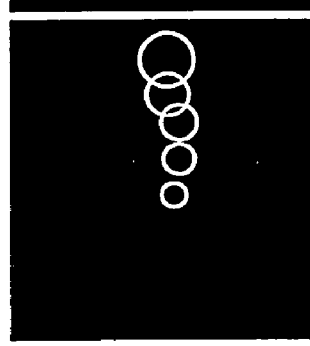
Figure 11D:
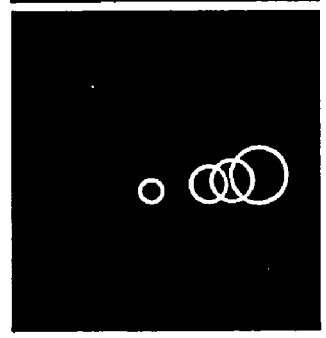
Figure 11E:
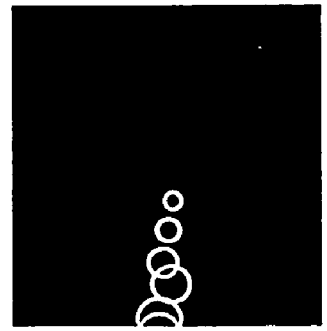

FIG. 10 illustrates the alpha channel of an image strip of the lights icon 140, by way of example. Similar illustrations could be made of the other status indicator icons. The left strip shows the first phase of burn in from black to full burn. The middle strip shows the second phase of burn in from full burn to normal. The right strip shows fade out from normal to black.

Using this strip, two animations are possible: from black, the image can burn in to a brightly glowing mass, then fade out to its normal representation; or, from the normal state the image can fade out to black (in this case the fade is accompanied by some blur). The entire image strip is generated automatically from the normal image of the light bulb for the icon, with the number of frames of each of the three segments (black to full burn in, full burn in to normal, normal to black) fully controllable, along with the amount of burn, fade or blur between sequential frames.

Overlay of Synthetic Particles

The virtual plankton or bubbles feature is now described. During real diving, plankton or air bubbles, when present, can be useful as an orientation guide, especially in mid-water where the seafloor and sea-surface are not visible. Plankton are visible as point specks. Since plankton are static in the water, save for current effects, they give a diver visual feedback as to the diver's own motion, thereby avoiding disorientation similar to that experienced by a skier in a blizzard or an airplane pilot in cloud. Similarly real bubbles are generally static, save for a gradually rising, and do not generally move to the left or right. Disorientation effects from remote piloting a ROV based on visual feedback from a GUI are similar to those for a real diver, but more acute, because of the limited field of view of the video camera and the fact that a diver can move his or hear head and eyes rapidly to view different directions, whereas this is not achievable to the same extent with a video camera on the ROV.

The invention therefore provides the GUI with an option of displaying synthesized artifacts to simulate the effect that plankton or bubbles would have on the view. These are referred to as virtual plankton and virtual bubbles.

During ROV motion, small particles appear on the GUI overlayed on the video footage which give the impression of flying towards the viewer as the ROV moves forwards. When maneuvering, for example turning to the left, the small particles will move in a curved trajectory to simulate the view that would occur if the particles were real objects static in the water. Similarly if the ROV is static the synthesized particles will not move on the GUI.

The synthesized particles may be enlarged when the computed distance between ROV and synthesized particle reduces and vice versa. In this variant, the synthesized particles may be given a bubble-like appearance with white outer rim and translucent interior.

FIGS. 11A-11E show five versions of a small display segment containing virtual bubbles for the cases of forward, right, down, left and up motion of the ROV respectively. For ease of representation multiple frames are overlayed in each figure, so that the bubble "motion" can be appreciated by virtue of the fact that the bubbles are enlarging with time. As can be seen the virtual bubbles move in a direction opposed to the movement direction of the ROV, as would real particles floating static in the water. In the case of virtual bubbles, the simulation may cause a gradual rising of the simulated particles, for a more realistic effect.

Overlay of synthesized particles is also useful to allow a user to differentiate between ROV motion and motion of objects in the viewed scene. For example, if a shark appears in open water and swims from the left to the right of the viewed image, the synthesized particles allow the viewer to differentiate this event from a static shark being viewed while the ROV rotates slowly counterclockwise.

To achieve this effect, the synthesized particle coordinates are calculated in 3D relative to the ROV which is taken as being situated at the origin position, since it is the viewing location of the scene. Each time increment, which may conveniently be set as equal to a frame exposure time (e.g. $\frac{1}{30}$ second), an additional number of synthesized particles is inserted into the scene, positioned in a seed volume lying relatively distant from the ROV along the straight-ahead orientation axis of the ROV. The number of synthesized particles inserted per time increment is proportional to the amount of motion that has occurred in the preceding time increment. Each time increment, the 3D coordinates of existing synthesized particles in the scene are recomputed according to the ROV motion that has occurred during the last time increment. The ROV motion may be taken from onboard telemetry from the ROV, for example speed sensors, compass bearing, depth gauge etc. Any available sensors which provide information on attitude, speed or acceleration of the ROV can be used to refine the particle motion. The motion of the ROV can also take account of the thruster control signals from the topside controller. The motion of the ROV can thus be tracked in the manner of inertial guidance or turtle graphics. Alternatively, the ROV position may be tracked independently, such as with sonar, ultrasonics, or a global positioning system (GPS).

To simulate motion of the synthesized particles in water currents, a random perturbation to the particle coordinates may be added. Use of a random generator in this way ensures that small perturbations are introduced to each of the synthesized particles' paths so that the motion is not too regular. This randomization effect is evident in FIGS. 11A-11E.

The 3D particle coordinates are then mapped to the 2D screen coordinates. The particle positions in the 2D screen coordinates are then applied to the video signal by overlay.

The process is then repeated for the next time increment. For each new time increment, the ROV motion parameters, such as telemetry signals, are re-read, those particles that have moved to lie outside the screen area are removed from the 3D data set, and new particles are inserted into the scene in the seed area.

Figure 12:
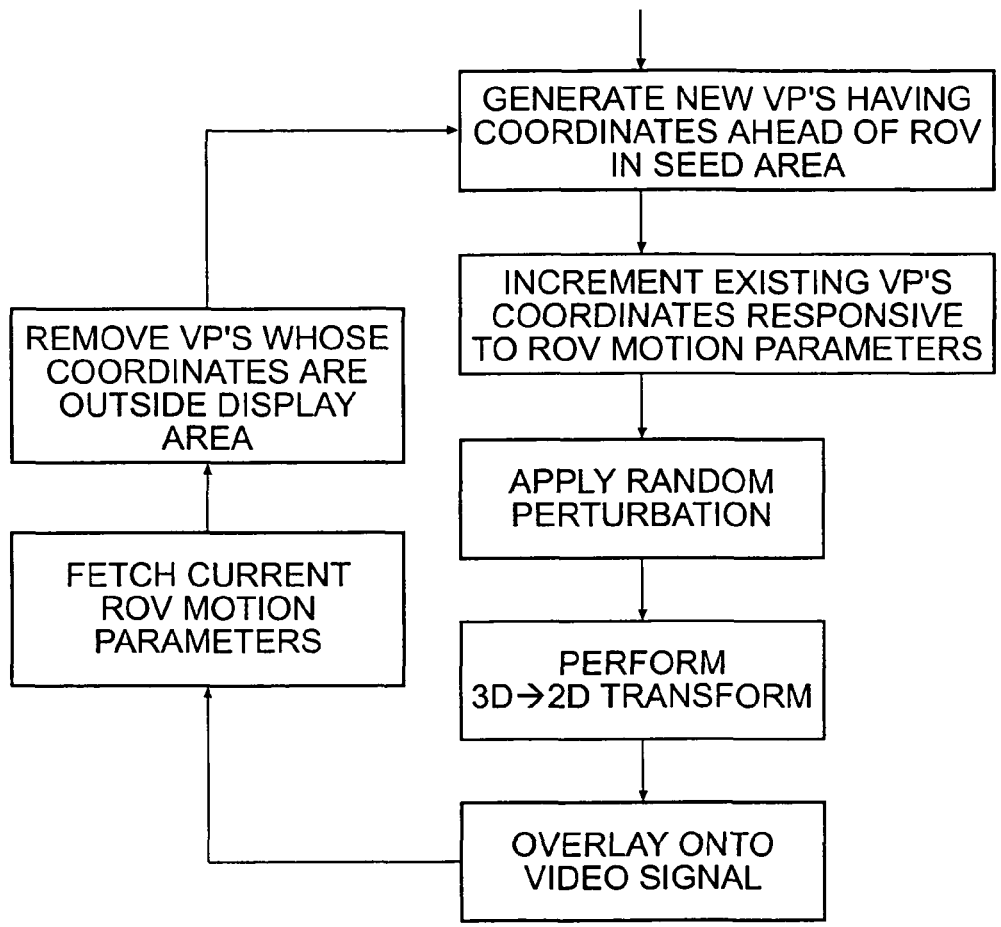
FIG. 12 is a flow diagram showing steps of a simulation algorithm for providing motion feedback in the GUI.

FIG. 12 is a flow diagram providing an overview of an example of the iterative process described above, taking virtual plankton (VP) particles as an example.

The virtual plankton or other synthesized particle effect can be switched on and off with a toggle action from hand controller button 358 (see FIG. 4). It is contemplated that the synthesized particle effect will often be activated initially when the ROV is deployed from a boat or shore and then used while driving in mid-water towards a target location, and then probably deactivated once the target location (e.g. a reef or wreck) is reached.

Alternative Motion Feedback Aids

Line features superimposed on the video footage may be used instead of the synthesized particle point features. The line features may be rectangle features that are overlayed on the video frames to give a "corridor" effect, in which the rectangles are generated in the distance centrally in the screen view, as perceived by the viewer, and then expanded about a point. The point can be kept static between frames for straight ahead motion of the ROV and can be moved up or down, or to the left or right, to take account of ROV steering or attitude changes. Shapes other than rectangles may be used, for example ovals.

Figure 13A:
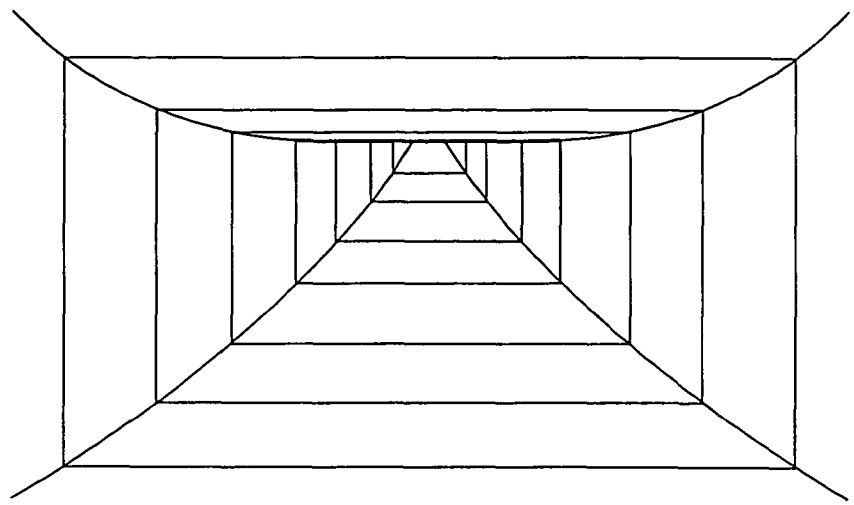
FIGS. 13A and 13B are schematic screen shots showing a "moving corridor" feature in the GUI, as an alternative way of providing motion feedback in the GUI.

FIG. 13A is a schematic screen shot of a corridor effect giving user feedback of upward driving of the ROV. For ease of representation the video footage on which the corridor is superposed is not illustrated.

Figure 13B:
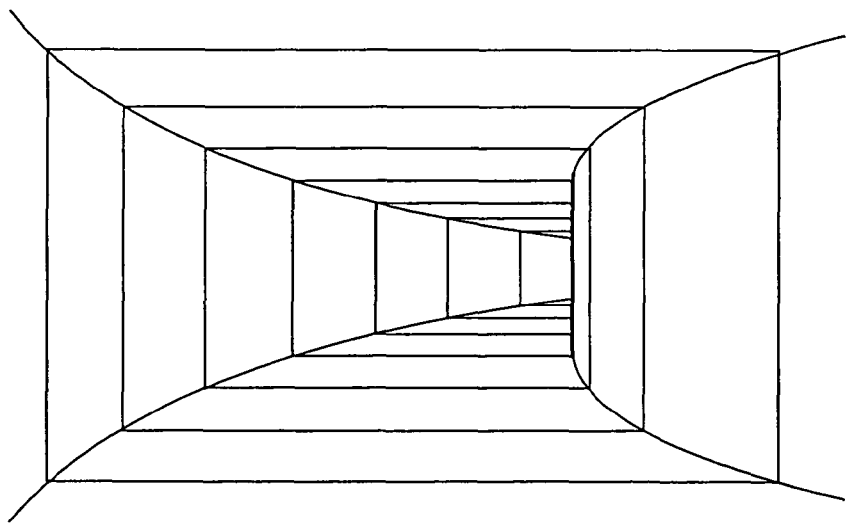

FIG. 13B is a schematic screen shot of a corridor effect giving user feedback of rightward driving of the ROV. For ease of representation the video footage on which the corridor is superposed is not illustrated.

A sparser modification of the corridor effect is a "rolling road" effect which may be considered as eliminating all but the horizontal base lines of the rectangles of the rolling road effect illustrated in FIGS. 13A and 13B.

Overlay Generator Hardware

The hardware in the topside computer 18 used to overlay the GUI described above onto the video signal conveying the video footage transmitted from the front or top camera of the ROV 10, prior to its representation on the display 20, is now described.

Figure 14:
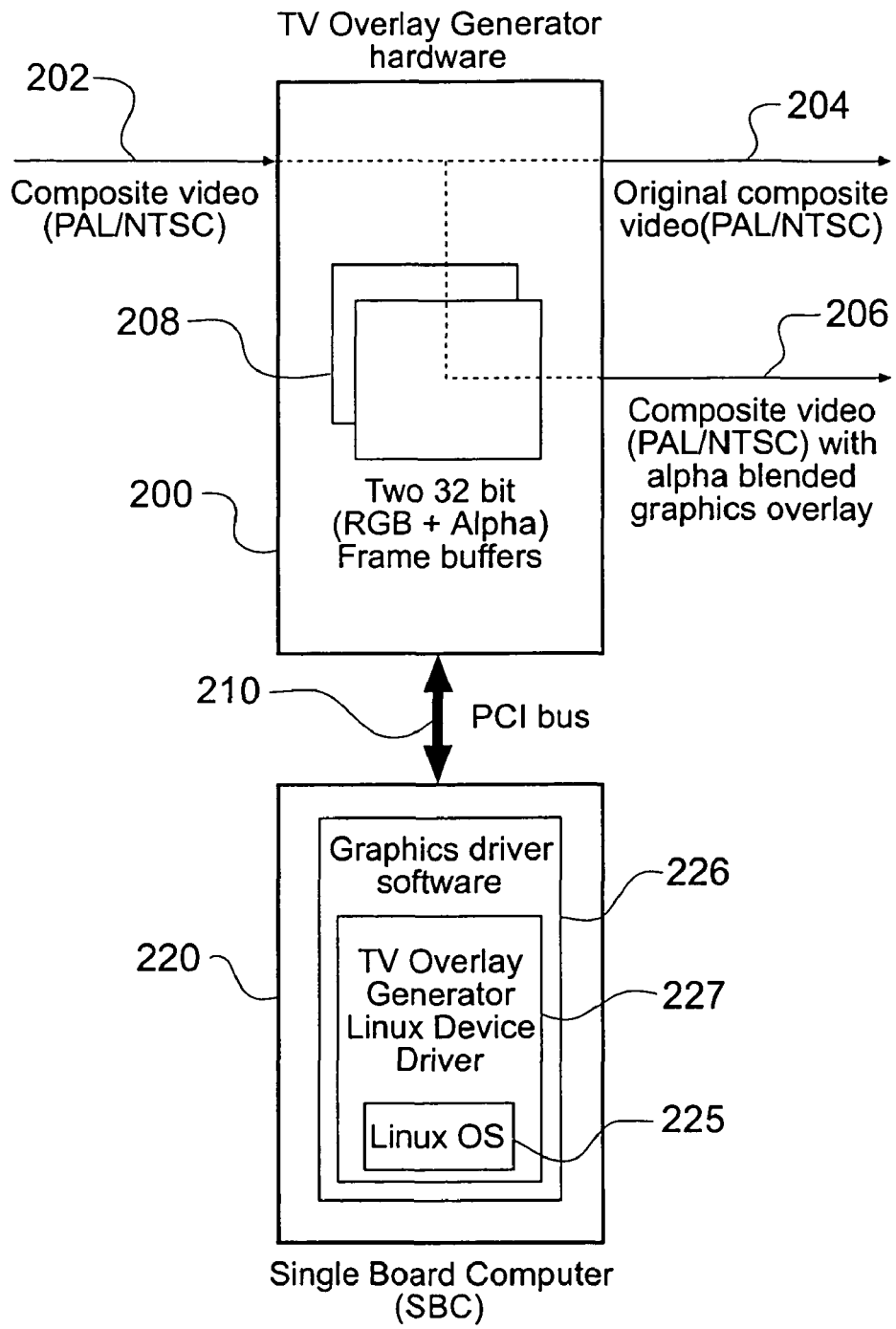
FIG. 14 is a block schematic diagram showing the hardware used to overlay the GUI onto the video footage.

FIG. 14 shows the TV overlay generator hardware used to overlay the GUI onto the video signal. This hardware is located with the topside control computer 18 (see FIG. 1) taking the form either of a custom plug-in interface card, or an external box. Alternatively, the hardware could be located in the ROV which would necessitate the hand control signals being communicated to the ROV through the umbilical cable. This would be slightly more complex to implement, but would allow a conventional PC without custom electronics to be used at the topside.

The TV overlay generator hardware 200 takes a composite video (PAL/NTSC) signal 202 as input, and provides two outputs, namely the original signal 204 (throughput) and the modified signal 206 which is the original signal with overlay of alpha blended graphics, the GUI. The twin outputs allows the user to benefit from the GUI feedback during shooting of video footage and simultaneous recording of the video footage without (and also with if desired) the GUI overlay. Video storage without GUI overlay may be desirable in some cases, for example when compiling a television program. There are two 32 bit frame buffers 208 in the TV overlay generator hardware. All drawing is done in the buffer which is not currently displayed, then when drawing is completed the offscreen buffer is scanned from the start of the next video field. The TV overlay generator hardware 200 is connected via a PCI bus 210 to a single board computer (SBC) 220 (which is the same component shown in FIG. 7 using reference numeral 388). The SBC runs on a Linux operating system and has a kernel space hardware device driver 227 to interface between the Linux kernel 225 and the user space graphics software 226. The graphics software performs all manipulation of the frame buffers and hence determines what the user sees on the television screen.

We claim:

1. An icon fade-out process for a graphical user interface of a remote operated vehicle for leisure use, comprising:
   receiving a command signal to remove an icon presented on real-time video footage from a camera on the remote operated vehicle; and
   progressively decreasing opacity of the icon presented on the video footage to change it from a normal representation to a faded representation during further frames of the video footage;
   wherein the icon is progressively blurred simultaneously with progressively decreasing its opacity.

2. The process of claim 1, wherein the normal representation is a featured, focused form of the icon.

3. The process of claim 1, wherein the faded representation is an invisible or barely visible form of the icon.

4. A computer program product, stored on a computer-readable medium, for implementing an icon fade-out process for a graphical user interface of a remote operated vehicle for leisure use, the product bearing instructions that, responsive to receipt of a command signal to remove an icon presented on real-time video footage from a camera on the remote operated vehicle, progressively decrease opacity of the icon presented on the video footage to change it from a normal representation to a faded representation during further frames of the video footage, wherein the icon is progressively blurred simultaneously with progressively decreasing its opacity.

5. A controller for a remote operated vehicle for leisure use comprising a graphical user interface operable, responsive to receipt of a command signal to remove an icon presented on real-time video footage from a camera on the remote operated vehicle, to progressively decrease opacity of the icon presented on the video footage to change it from a normal representation to a faded representation during further frames of the video footage, wherein the icon is progressively blurred simultaneously with progressively decreasing its opacity.

* * * * *